United States Patent
Samuelsson et al.

(10) Patent No.: US 8,498,495 B2
(45) Date of Patent: Jul. 30, 2013

(54) BORDER REGION PROCESSING IN IMAGES

(75) Inventors: Jonatan Samuelsson, Skarpnäck (SE); Kenneth Andersson, Gävle (SE); Clinton Priddle, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 933 days.

(21) Appl. No.: 12/524,309

(22) PCT Filed: Jan. 14, 2008

(86) PCT No.: PCT/SE2008/050035
§ 371 (c)(1),
(2), (4) Date: Jul. 23, 2009

(87) PCT Pub. No.: WO2008/091207
PCT Pub. Date: Jul. 31, 2008

(65) Prior Publication Data
US 2009/0316997 A1 Dec. 24, 2009

Related U.S. Application Data

(60) Provisional application No. 60/897,511, filed on Jan. 26, 2007.

(51) Int. Cl.
*G06K 9/40* (2006.01)
*G06K 9/00* (2006.01)
*H04N 5/225* (2006.01)
*H04N 11/02* (2006.01)
*H04N 11/04* (2006.01)
*H04N 7/12* (2006.01)

(52) U.S. Cl.
USPC ....... 382/275; 382/103; 348/169; 375/240.15

(58) Field of Classification Search
None
See application file for complete search history.

(56) References Cited

U.S. PATENT DOCUMENTS

| | | | |
|---|---|---|---|
| 7,978,938 B1 * | 7/2011 | Wilensky | 382/311 |
| 2002/0097439 A1 * | 7/2002 | Braica | 358/3.26 |
| 2008/0095238 A1 * | 4/2008 | Wu et al. | 375/240.16 |

FOREIGN PATENT DOCUMENTS

| | | |
|---|---|---|
| JP | 10-336646 A | 12/1998 |
| WO | WO 2005109899 A1 * | 11/2005 |

* cited by examiner

*Primary Examiner* — Randolph I Chu

(57) ABSTRACT

A border region is identified in an image by calculating an average of pixel values in a row or column of the image. Differences in property values are determined between each pixel in the row or column and a neighboring pixel present on a same column or row but in a neighboring row or column. An average difference is calculated based on these differences. The pixels in the row or column are classified as belonging to a border region or internal region of the image based on the average pixel value and the average pixel difference.

8 Claims, 7 Drawing Sheets

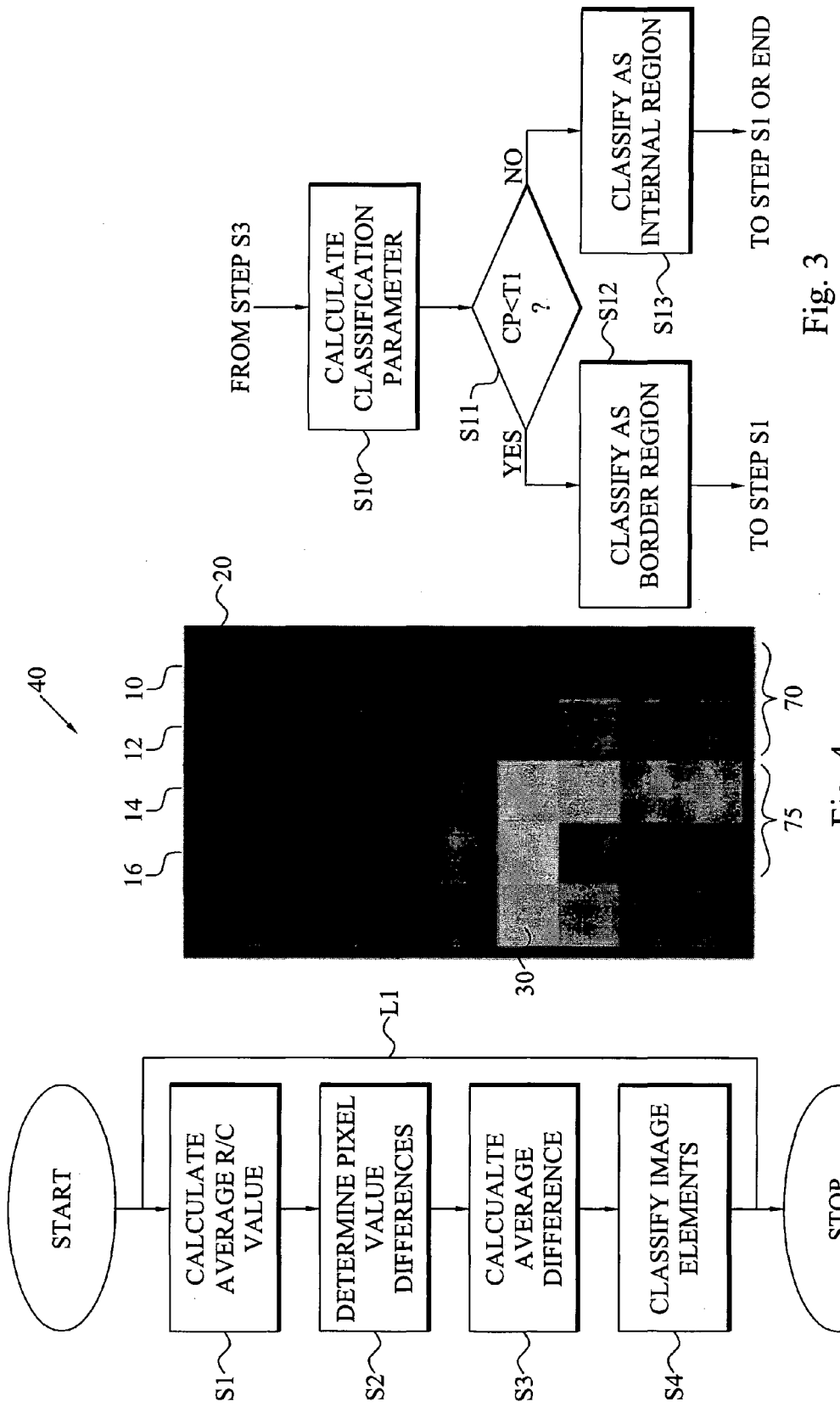

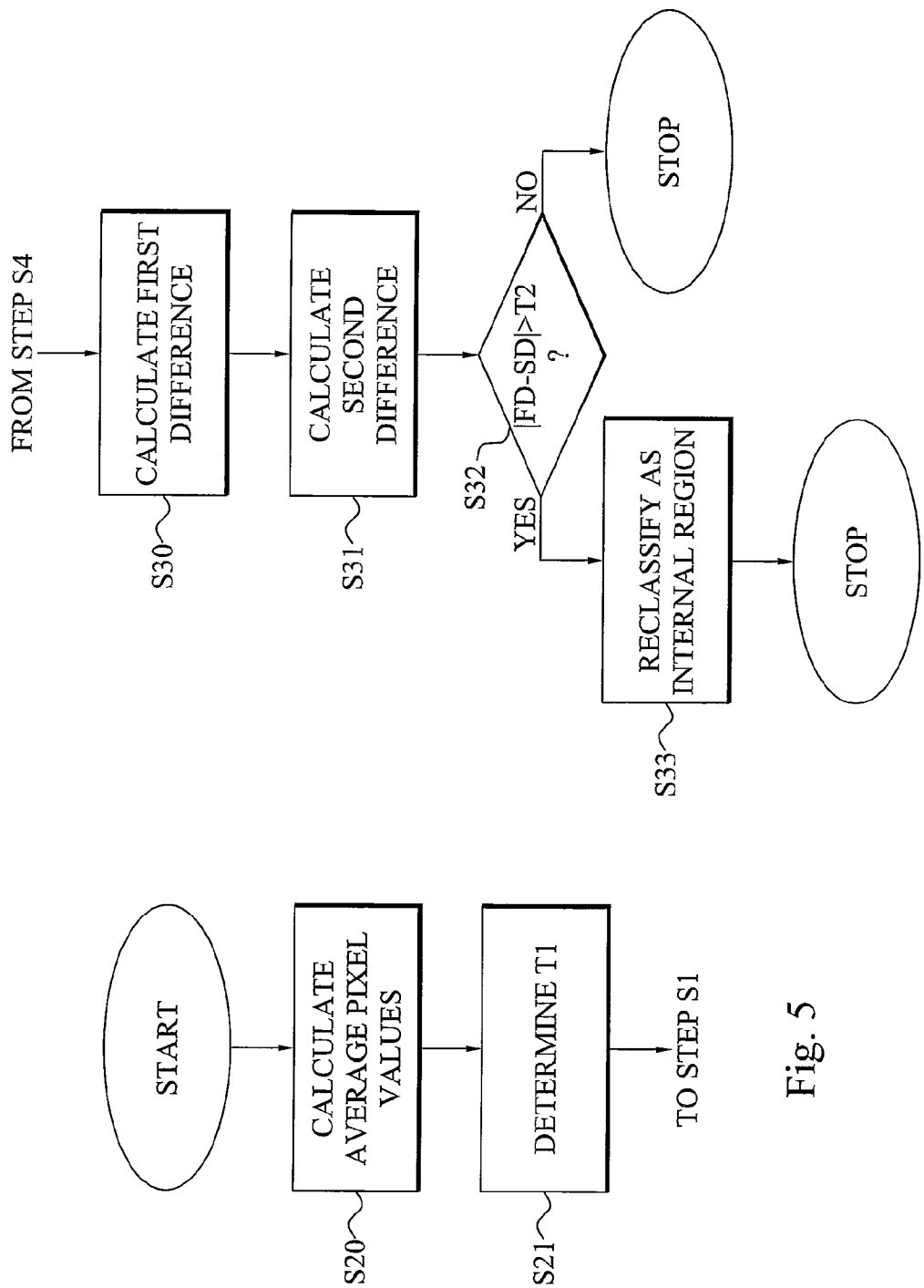

BORDER REGION PROCESSING IN IMAGES

This application claims the benefit of U.S. Provisional Application No. 60/897,511, filed Jan. 26, 2007, the disclosure of which is fully incorporated herein by reference.

TECHNICAL FIELD

The present invention generally relates to image processing, and in particular to border region processing of images.

BACKGROUND

The motivation of frame rate up-conversion is that a video sequence with higher frame rate is generally considered to give higher quality experience than a video sequence with lower frame rate. The frame rate of a video sequence can be increased by inserting predicted frames in between existing frames. A good approach is to predict the in-between frame using bi-directional block based motion estimation, searching for linear motions between the previous frame and the next frame in the input video sequence. It is possible to use non-linear approaches that can represent acceleration, but the linear approach is used because of its simplicity and low complexity. The in-between frame is divided into blocks and to each of these a motion vector must be assigned in some way.

There is a problem with frame rate up-conversion that occurs along the borders of the image. In many recorded video sequences, there is a black line along one or more of the borders. It can be seen along the right border in image 50 to the left in FIG. 1. In traditional rate up-conversion algorithms [1-3], there is no special treatment of such borders. This can have the consequence of assigning motion vectors pointing to the border area, which may cause the line to follow the background motion and move from the edge into the picture, as seen in the middle image 60 in FIG. 1.

SUMMARY

The present invention overcomes these and other drawbacks of the prior art arrangements.

It is a general object of the present invention to provide a border region identification in an image or a frame.

It is a particular object of the invention to provide a frame interpolation/extrapolation that utilizes the border region identification in the determination of image element property values.

These and other objects are met by the invention as defined by the accompanying patent claims.

Briefly, the present invention involves identifying a border region in an image or frame comprising rows and columns of image elements. An average value of the property values of the image elements in a row or column to be tested is calculated. Furthermore, a respective difference, for each image element in the row or column, in property values is determined between the property value of the image element and the property value of a neighboring image element present on a same column or row but in an neighboring row or column, which neighboring row or column is preferably closer to the image center than the tested row or column. An average difference value is calculated from the determined differences. The image elements of the current row or column are then classified as belonging to the border region of the image or an internal image region based on the average value and the average difference.

In a preferred embodiment, a classification parameter is calculated based on the average value and the average difference, preferably as a, possibly weighted, sum of the average value and the average difference. This parameter is compared to a threshold value and the classification is performed based on the comparison. In the case of black borders, a tested row or column is classified as border row or column if its classification parameter is below a threshold value otherwise it belongs to the internal region of the image.

If the current row or column is classified as a border row or column, the neighboring row or column that is being closer to the image center is preferably also tested and so on until a tested row or column is classified as being an internal row or column. The procedure is preferably repeated for all edges of the image.

The invention also involves utilizing the image element classification when determining property values of an image or frame that is interpolated or extrapolated from available images in a video sequence. In such a case, a group of image elements in the interpolated/extrapolated image is determined based on property values of a first group in a first image of the video sequence and property values of a second group in a second image of the video sequence. However, only those image elements in the first and second group that are not identified as border image elements are used when calculating the property values of the interpolated/extrapolated group. This prevents moving any border region into the internal region of the constructed image.

The present invention also involves devices for identifying border regions in images and for estimating property values of constructed images.

SHORT DESCRIPTION OF THE DRAWINGS

The invention together with further objects and advantages thereof, may best be understood by making reference to the following description taken together with the accompanying drawings, in which:

FIG. 2 is a flow diagram of a border region identification method according to an embodiment of the present invention;

FIG. 3 is a flow diagram illustrating an embodiment of the classifying step in the identification method of FIG. 2;

FIG. 4 is a close-up view of a portion of an image in connection with a border region;

FIG. 5 is a flow diagram illustrating additional steps of the identification method of FIG. 2;

FIG. 6 is a flow diagram illustrating additional steps of the identification method of FIG. 2;

DETAILED DESCRIPTION

Figure 1:
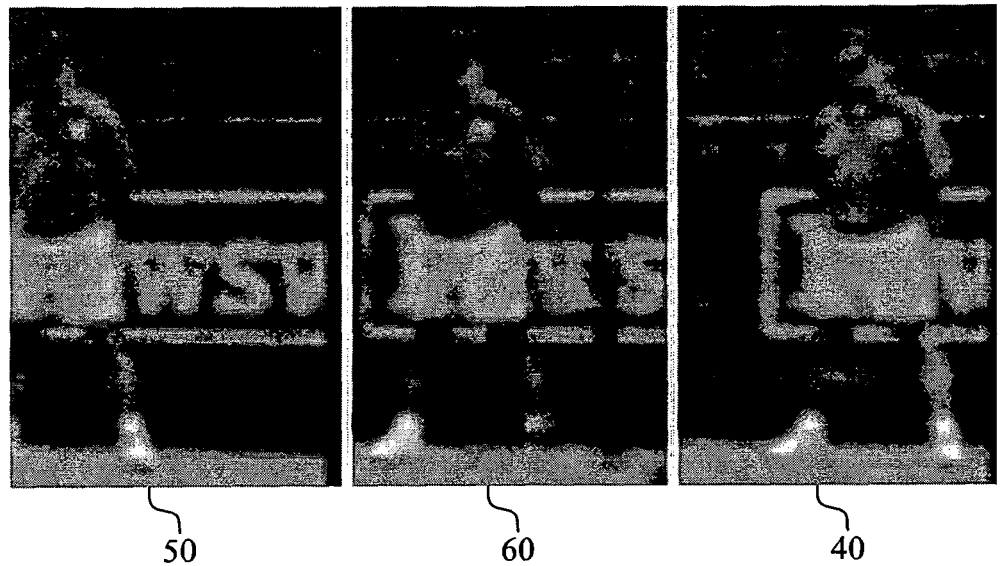
FIG. 1 illustrates the problem of border lines appearing in interpolated and extrapolated images according to the prior art techniques.

Throughout the drawings, the same reference characters will be used for corresponding or similar elements.

The present invention generally relates to image processing and in particular to methods and devices for identifying border regions in images, such as in image frames of a video sequence.

As is well known in the art, many images and pictures often contain a border on one or more of its sides. This phenomenon is illustrated in the left image 50 of FIG. 1. As is seen in the figure, there is a black line running along the right vertical image side. Such borders can be present due to inherent features of the image recording process or device. Furthermore, borders can be added to images during transcoding between different image formats, such as when going from "normal" screen to widescreen or vice versa.

The inclusion of at least one border in an image 50 can lead to problems in the further processing of the image 50 or the frame/video sequence containing the image 50. For instance, during frame rate up-conversion, intermediate images 60 are generated based on original images 40, 50 in the video sequence to thereby increase the frame rate. The pixel values of such an intermediate image 60 are determined, i.e. interpolated or extrapolated, from the corresponding pixel values of the neighboring images 40, 50. The inclusion of a border in at least one of the images 50 used in this pixel value determination can cause the border line to follow the background motion when traveling between the images 50, 60, 40 and thereby unintentionally appear in the interpolated/extrapolated image 60 as is shown in FIG. 1.

Thus, identification of border pixels and border regions in an image or frame is important and leads to significant advantages, such as in connection with frame rate up-conversion of a video sequence containing at least one image or frame with a border.

In the present invention, a video or frame sequence comprises multiple, i.e. at least two, frames or images. Such a frame can in turn be regarded as composed of a series of one or more slices, where such a slice consists of one or more macroblocks of image elements or pixels. In the present invention, the expression "image element" is used to denote a smallest element of a frame or image in a sequence. Such an image element has associated image element properties, such as color (in the red, green, blue, RGB, space) or luminance (Y) and chrominance (Cr, Cb or sometimes denoted U, V). A typical example of an image element is a pixel of a frame or picture. The present invention is particularly adapted to a video sequence comprising multiple consecutive frames at a given frame rate.

The image elements are organized into groups of image elements. The expression "group of image element" denotes any of the prior art known partitions of frames and slices into collections of image elements that are handled together during decoding and encoding. Generally, such a group is a rectangular (M×N) or square (M×M) group of image elements. An example of such a grouping is a macroblock in the video compression standard. Such a macroblock generally has a size of 16×16 image elements. A macroblock can consists of multiple so-called sub-macroblock partitions, such as 16×8, 8×16, 8×8, 8×4, 4×8 and 4×4 image elements. The 8×8 sub-macroblock partition is often denoted as a sub-macroblock or sub-block, whereas a 4×4 partition is often denoted block.

An image having a border of the present invention can have the border line at all its edges, thereby basically constituting a frame around the image. Alternatively, border lines can be present on opposite edges of the image such as when switching between normal and widescreen formats. The border line can also be present along a single image edge as is illustrated in FIG. 1. Thus, a border region of an image according to the present invention will include one or more image element rows, one or more image element columns or one or more image element rows and columns present at one or more edges of the image.

As is well known in the art, the border region or line is typically black or very dark, i.e. having zero or low luminance. A border region is, according to the invention, any region present along one or more edges of an image and having a comparatively homogenous color or luminance value. In most practical applications, the border region is black (zero luminance) or at least of a dark color (low luminance value). However, the teachings of the present invention can also be utilized for identifying other "one-colored" regions, e.g. white (maximum luminance, typically 255 for the case of $2^8$ luminance levels) or of a light color (high luminance value).

FIG. 2 is a flow diagram illustrating a method of identifying a border region in an image, such as an image of a frame or video sequence. The image comprises multiple rows and columns of image elements. The method starts in step S1, which involves calculating an average value of property values of image elements in a first row or a first column of the image. The property values of the image elements used in the averaging are preferably luminance values as taught above, though the invention is not limited thereto. In the following, the present invention is described in further detail in connection with identifying a border region along columns of the image elements in the image. As a consequence, the step S1 involves calculating the average values of the property values in a first column in the image. However, the same procedure can also or instead be applied to rows of image elements in the image. In such a case, the expression "column" in the following description is simply replaced by "row" and the expression "row" is replaced by "column".

The first column is preferably the outermost column along the left or right edge of the image. If $y_{ij}$ denotes the property value of an image element positioned on row i in column j, the average value $AV_j$ for the column j is calculated in step S1 as:

$$AV_j = \frac{\sum_{i=0}^{M-1} y_{ij}}{M} \qquad (1)$$

where the column j comprises M image elements. The average value $AV_j$ is, thus, preferably a representation of the average luminance value in the column j.

A next step S2 determines a respective difference in property values for each image element in the column j and the corresponding image element in a neighboring column j+1 or j−1. Thus, the difference in property values are calculated pairwise for image elements present on a same row in the column j and in the neighboring column j±1. As the column j and the neighboring column j±1 comprise M image elements, M such differences in property values are determined in the step S2.

The neighboring column j±1 is preferably the neighboring column that is positioned closer to the center of the image as compared to the column j. For instance if the current column j is the first column when going from the left to the right of the image, the neighboring column j+1 is the second column. Correspondingly, if the current column j is the last column when going from the left to the right of the image, the neighboring column j−1 is the second last column and so on.

An average difference value is calculated in step S3 based on the M differences calculated in step S2. This average difference $AD_j$ for column j is, thus, calculated as:

$$AD_j = \frac{\sum_{i=0}^{M-1} y_{ij} - y_{i(j+1)}}{M} \quad (2)$$

if the next column j+1 is positioned to the right (towards the image center) relative the current column j, or as:

$$AD_j = \frac{\sum_{i=0}^{M-1} y_{ij} - y_{i(j-1)}}{M} \quad (3)$$

if the next column j−1 is instead positioned to the left (towards the image center) relative the current column j. The average difference $AD_j$ is thus a representation of the average change in property values, preferably luminance, between the two neighboring columns.

The step S4 thereafter utilizes the calculated average value $AV_j$ from step S1 and the average difference $AD_j$ for classifying the image elements of the column j as belonging to the border region or not of the image.

If the current column j is classified in step S4 as belonging to the border region of the image, the loop of steps S1 to S4 is preferably performed for the neighboring column j±1 to investigate whether also the image elements of that column j±1 belongs to the border region, which is schematically illustrated by the line L1. If also this column j±1 is classified as a border region based on the average value $AV_{j±1}$ and the average difference $AD_{j±1}$, the method is applied to a next column j±2 that is positioned closer to the image center than the column j±1 and so until a tested column is no longer classified as border region column.

In a preferred embodiment, the method defined by the operation steps S1 to S4 is preferably applied to a first column or first row that is the outermost column or row along one of the image edges. If the column or row is classified as a border region column or row, the method continues by investigating a next column or row that is closer to the center of the image than the previously tested and classified column or row. The method continues until one reaches a column or row that is not classified as belonging to the border region based on its calculated average value and average difference. The method is also preferably applied to the outermost column or row at the opposite image edge. Once image elements along these two image edges have been tested, the method is preferably applied to the remaining two image edges, which will be rows (or columns) if the already tested image element arrays where columns (or rows). The border region identifying method of the present invention and disclosed in FIG. 2 is in other words preferably applied for investigating rows and columns along all four image edges. The particular order in which the image edges are tested, whether in parallel or in series, does not matter for the teachings of the present invention.

For instance, if a current row i is tested, an average value $AV_i$ of the property values of the image elements in the row i is calculated. A difference in property values is determined for an image element in the current row i and an image element present in a same column but in a neighboring row i±1, where this neighboring row i±1 is closer to the image center than the current row i. Such a difference is determined for each image element in the row i. The average difference $AD_i$ is then calculated based on these determined differences. The image elements in the current row i are classified as belonging to the border region or an internal region of the image based on the calculated average value $AV_i$ and the average difference $AD_i$.

FIG. 3 is a flow diagram illustrating a preferred embodiment of the classifying step S4 of FIG. 2. The method continues from step S3 of FIG. 2. In a next step S10, a classification parameter $CP_j$ is calculated based on the average value $AV_j$ and the average difference $AD_j$ for the current column j. The calculation of step S10 preferably involves calculating the parameter as a weighted sum of the average value and the average difference:

$$CP_j = \alpha AV_j + \beta AD_j \quad (4)$$

where $\alpha$ and $\beta$ are two non-zero weights, which in a preferred embodiment are both equal, i.e. $\alpha=\beta$, and more preferably $\alpha=\beta=1$. Combining equations 1, 2 and 4 yields the following equation for the classification parameter:

$$CP_j = \alpha \frac{\sum_{i=0}^{M-1} y_{ij}}{M} + \beta \frac{\sum_{i=0}^{M-1} y_{ij} - y_{i(j+1)}}{M} \quad (5)$$
$$= \frac{\sum_{i=0}^{M-1} (\alpha + \beta) y_{ij} - \beta y_{i(j+1)}}{M}$$

and the corresponding expression by combining equations 1, 3 and 4:

$$CP_j = \alpha \frac{\sum_{i=0}^{M-1} y_{ij}}{M} + \beta \frac{\sum_{i=0}^{M-1} y_{ij} - y_{i(j-1)}}{M} \quad (6)$$
$$= \frac{\sum_{i=0}^{M-1} (\alpha + \beta) y_{ij} - \beta y_{i(j-1)}}{M}$$

In the embodiment utilizing luminance as preferred image element property, a column j having image elements with low luminance, i.e. being black or close to black, has a comparatively low, i.e. close to zero, average value $AV_j$. Correspondingly, light image elements or a column j with varying luminance values will have a comparatively larger average value $AV_j$. Furthermore, if the difference in luminance between the current column j and the neighboring column j±1 is low, i.e. the columns are of the same or fairly the same luminance, the average difference $AD_j$ for column j is zero or close to zero. However, if the neighboring column j±1 would instead be of a higher luminance, the average difference $AD_j$ becomes negative.

The classification parameter that is calculated in step S10, preferably according to any of equations 4 to 6 above is then compared with a threshold value T1 in step S11. The classification of the image elements in the current column j is performed based on this threshold comparison. In a preferred implementation, the column j is classified in step S12 as a border region if the classification parameter is smaller than the threshold value. Otherwise, i.e. if the classification parameter exceeds (or is equal to) the threshold, the column j is classified in step S13 as belonging to a non-border, i.e. internal region.

Thus, columns j having dark (low luminance) image elements and/or where the average difference in luminance between the column j and its neighboring column j±1 is negative, i.e. the neighboring column j±1 has comparatively lighter (high luminance) image elements, are, depending on the actual value of the threshold, classified as border regions. Light columns j (high luminance) and/or columns j having comparatively darker (low luminance) column neighbors j±1 are more likely to be classified as belonging to the internal region of the image.

If the column j is classified as a border column in step S12, the method preferably continues to step S1 of FIG. 2 for the purpose of classifying a next neighboring column j+1 or j−1 that is one step closer to the center of the image than the current column j. This classification is preferably repeated column by column towards the image center until a tested column is classified as being an internal region column. The next column edge of the image is then preferably tested, as are the two row edges as previously mentioned. If the current column is classified as an internal column in step S13, the method ends if all image edges have been tested or the method continues to step S1 of FIG. 2 for the purpose of testing another horizontal or the vertical image edges.

If the border region would instead correspond to a white line, i.e. having high luminance, the column (or row) is classified as a border column (or row) if the calculated classification parameter exceeds a defined threshold value, otherwise it is an internal region column (or row).

The threshold value utilized in the comparison of step S11 is preferably determined through a test procedure, where different input images are classified by the algorithm of the invention. The threshold value can then be adjusted or set by an operator to a particular value that gives, on average, a correct classification of image columns and rows as border regions or internal regions. Such test procedures have been conducted, giving a threshold value of 24 as a good candidate. The present invention is though not limited to this particular value.

In a more elaborated embodiment, the threshold value can be adjusted or set based on the properties of the image elements in the current image. This procedure is illustrated in FIG. 5. The method starts in step S20, where the average property value APV of the image elements is determined for the image:

$$APV = \frac{\sum_{i=0}^{M-1}\sum_{j=0}^{N-1} y_{ij}}{M \times N} \quad (7)$$

where the image comprises M rows and N columns of image elements, each having an image element property value $y_{ij}$. The next step S21 determines or adjusts the threshold value T1 based on the calculated average property value. The method then continues to step S1 of FIG. 2.

This embodiment has the advantage of adjusting or setting the threshold value based on the particular property values in the image. This means that a different threshold value can be used for a dark image having image elements of rather low luminance as compared to a lighter image, where the image elements have comparatively higher luminance values. In the former case, the threshold value is preferably lower as compared to the threshold used for the lighter image.

In this embodiment, there can be a set of available different threshold values, which are adapted for different intervals of average property values. For instance, if $0 \leq APV < k_1$, a first threshold value is utilized, if $k_1 \leq APV < k_2$ a second, preferably larger, threshold value is used and so on. Step S21 would then involve checking in which interval the current average property value falls and use the threshold value associated or assigned to that interval.

Another possible implementation is to have a default threshold value, such as 24, and then adjust this value based on the determined average property value, such as:

$$T1 = DT - \kappa(DV - AVP) \quad (8)$$

or $$T1 = DT \times \kappa \times \frac{AVP}{DV} \quad (9)$$

where DT is the default threshold, $\kappa$ is a non-zero weight, which could be one or some other non-zero, positive number, and DV is a default value, to which the calculated average property value of the image is compared in the threshold adjustment. In both equations 8 and 9, darker images have lower adjusted threshold values as compared to lighter images.

FIG. 4 is a schematic illustration of a portion of an image 40 having a border region 70 identifiable according to the invention. In the figure, five columns 10 to 16 of image elements 30 (of which four have been assigned reference numbers) are illustrated. The column 10 to the right is an edge column, i.e. being the rightmost column 10 in the image 40. As is seen in the figure, the image elements 30 of that column 10 are clearly part of the black line forming the border region 70. This is evident as all image elements 30 in the column 10 are black or very close to black. Furthermore, the image elements in the neighboring column 12 have, when comparing image elements on a same row, higher luminance values. As a consequence, the classification parameter for the column 10 will actually be lower than zero. The second outermost column 12 does not have the same zero luminance as the previous column 10. However, the image elements 30 of that column 12 are still classified as belonging to the border region 70 since it gives a negative average difference when compared to the next column 14. As consequence, also the classification parameter for column 12 will be lower than the threshold value.

However, the next column 14 has even lighter image elements 30. In addition, the pairwise difference in luminance values for that column 14 and the neighboring column 16 being one step closer to the image center is not negative enough for reducing the average luminance of the column 14 so that the classification parameter of the column 14 becomes lower than the threshold value. As a consequence, this column 14 becomes classified as belonging to the internal region 75 of the image 40.

Thus, the present invention can identify and classify a column 12 (or row) of image elements 30 as belonging to the border region 70 even though not all its image elements 30 are black, through the usage of the average difference value in the classification parameter. It is important that this column 12 is identified and labeled as part of the black line 70 even though it is not entirely black, otherwise it can produce artefacts in an in-between image during frame rate up-conversion because it is darker than the image content.

FIG. 6 illustrates additional steps of the identifying method of FIG. 2. The method continues from step S4 of FIG. 2, where a column (or row) has been identified as belonging to the border region of the image. A next step S30 calculates a first difference FD in property values of an image element in the current column j and an adjacent image element in the same column j:

$$FD = y_{ij} - y_{(i\pm 1)j} \quad (10)$$

Thus, if the image element is present on row i in column j, the adjacent image element is present on row i+1 or i−1 in column j. A second difference SD is calculated in step S31 between the property values of the image element and the average $AV_j$ of the property values in the column j:

$$SD = y_{ij} - AV_j = y_{ij} - \frac{\sum_{i=0}^{M-1} y_{ij}}{M} \quad (11)$$

The current image element is re-classified as belonging to the internal region and not the border region if the first difference differs from the second difference with more than a maximum threshold. This comparison can, for instance, be implemented as illustrated in step S32, where the absolute value of the difference between the first difference and the second difference is compared to the maximum threshold T2. If the absolute value is equal to or lower than the threshold, the image element is still regarded as a border image element and the method ends. However, if the absolute value exceeds the threshold, the method continues to step S33, where the image element is reclassified as belonging to the internal image region. A further possible comparison is to calculate the quotient of the first and second difference, or the quotient of the absolute value of the first difference and the absolute value of the second difference. The quotient is then compared to a threshold value.

In an alternative embodiment of step S33, not only the investigated image element but the whole column is reclassified as belonging to the internal image region. This means that if a column that has previously be classified as a border region column contains at least one or, alternatively, at least a minimum multiple number of image elements that are reclassified in step S33, the whole column could be reclassified as an internal region column. This prevents broken columns, where some of the column image elements are classified as border region and other image elements are regarded as part of the internal image region.

This optional but preferred reclassification embodiment is used for discriminating local changes in connection with an image edge. Thus, an internal region of an image close to an image edge may be comparatively dark, such as showing a night sky, while a portion of this image includes much lighter image elements, such as corresponding to stars or the moon in the dark sky. In such a case, the high luminance of the one or few image elements in the column that corresponds to a star or the moon might not be enough to get a classification parameter that exceeds the threshold value, in particular if no adaptation of the threshold value is utilized, to thereby classify the column as an internal region. The additional check of the method disclosed in FIG. 6 and presented above is then utilized to correct any such misclassifications that can occur in connection with "difficult", dark images.

The method disclosed above and presented in FIG. 6 is preferably repeated for all image elements in the current column j. In a preferred embodiment, the method steps starts with the first $y_{0j}$ (or last $y_{(M-1)j}$) image element in the column j, which is then compared in step S30 to the next image element $y_{1j}$ (or $y_{(M-2)j}$) in the column j. The investigation of the image elements in the current column j can optionally be ended once an image element requiring a re-classification according to FIG. 6 has been identified as the whole column j could then be re-classified. Furthermore, the operational steps illustrated in FIG. 6 are preferably repeated for all columns and/or rows initially classified as belonging to the border region.

The classification of the present invention is in particular advantage in connection with frame rate up-conversion to prevent a border region or black line from emerging inside an interpolated or extrapolated image or frame.

Figure 7:
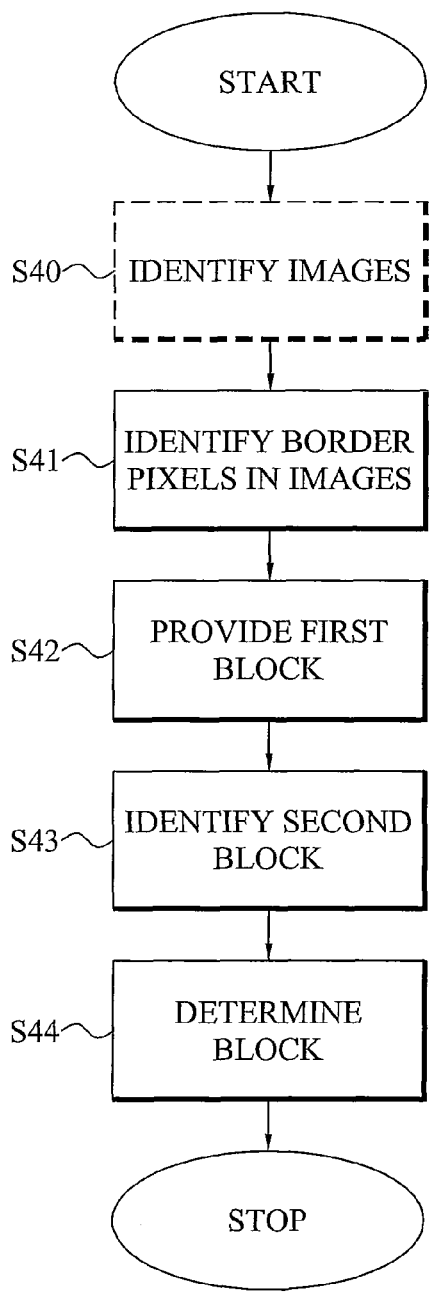
FIG. 7 is a flow diagram illustrating a method of determining pixel values according to an embodiment of the present invention.

FIG. 7 is a flow diagram illustrating a method of estimating property values of a group of at least one image element in an image or a frame associated with a time instance in a video sequence. This estimation is preferably performed as a part of a frame rate up-conversion procedure to add one or more frames to a video sequence through frame interpolation or extrapolation.

The method starts in the optional step S40, where at least two images in the video sequence to use in the estimation are identified. In a typical embodiment, one of the images corresponds to a previous time instance relative the intermediate image to be interpolated while the other of the images corresponds to a subsequent time instance in the sequence. In a preferred embodiment, the two images are the images that are positioned immediately before and immediately after the intermediate image in terms of time. In other words, the images could be regarded as neighboring images. In this image interpolation, more than two image can actually be used, such as using P previous images corresponding to time instance $t_{k-1}, t_{k-3}, \ldots, t_{k+1-2P}$ and Q following images corresponding to time instances $t_{k+1}, t_{k+3}, \ldots, t_{k-1+2Q}$, for interpolating an image of time instance $t_k$.

Correspondingly, when extrapolating an image or frame at time $t_k$ two or more previous images at times $t_{k-1}, t_{k-3}, \ldots, t_{k+1-2P}$ or two or more following images at times $t_{k+1}, t_{k+3}, \ldots, t_{k-1+2Q}$ are used.

The next step S41 identifies border image elements in at least a first image of the at least two images used as reference image in the interpolation or extrapolation. This step S41 is performed as previously described herein to identify any image elements in connection with zero, one or more image edges in the two images that form part of a black line or other border region.

A next step S42 provides a first group of multiple image elements in the classified first image. This first group comprises at least one image element identified as belonging to the border region in step S41 and at least one image element identified as not belonging to the border region of the first image in step S41. For instance, if the image element group comprises 4×4 image elements, the image elements in one, two or three columns and/or rows could be classified as border image elements, while remaining image elements are internal image elements.

The step S43 identifies a second group of at least one image element in the second (previous or subsequent) image associated with a previous or following time instance in the video sequence. The second group is preferably identified based on a displacement vector associated with the first group. Thus, the displacement vector points, when applied from a corresponding position that the first group would have had in the second image, towards the second group.

Finally, the property values of the group to be interpolated/extrapolated are determined based on the property values of those image elements in the first group identified as not belonging to the border region in the first image and the property values of the second group. If the border identification of step S41 is also applied to the second image, step S44 involves only utilizing the image elements identified as not belonging to the border region in the first image and the image elements identified as not belonging to the border region in the second image for determining the interpolated/extrapolated group.

Thus, the image element classification and identification of the present invention is utilized for excluding those image elements that are identified as forming part of the border region from the image element interpolation/extrapolation. In clear contrast, only those image elements that are not identified as belonging to the border region are available as reference image elements when calculating the property values for the image elements in the group to be determined. This exclusion of border image elements reduces the risk of the border region (black line) appearing in the interpolated/extrapolated image and thereby significantly reduces the occurrence of such artefacts.

Figure 8:
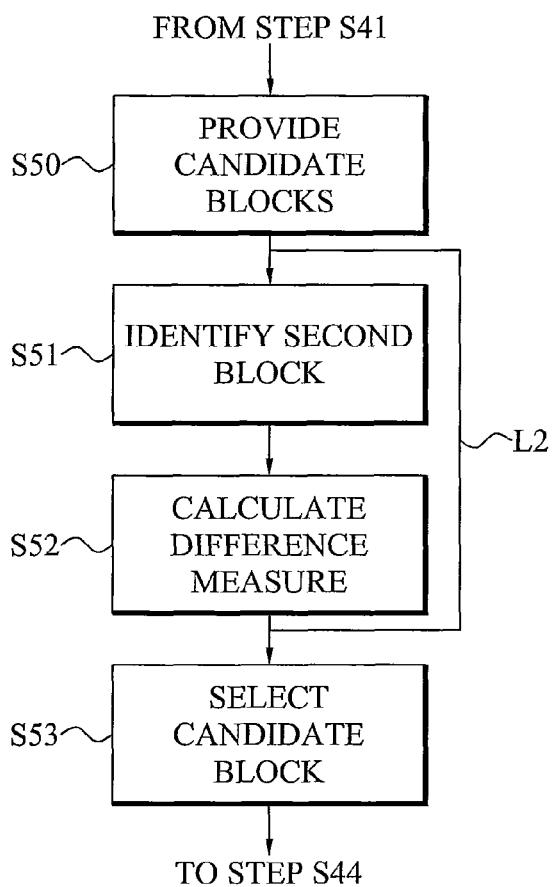
FIG. 8 is a flow diagram illustrating an embodiment of the providing and identifying steps of FIG. 7 in more detail.

FIG. 8 illustrates a possible implementation of the providing and identifying steps of FIG. 7 in more detail. The method continues from step S41 of FIG. 7. A next step S50 provides a set of multiple, i.e. at least two, candidate groups in the first image. Each of these candidate groups comprises at least one image element, typically multiple image elements, and is associated with a respective displacement representation or vector. These displacement vectors can be fetched from the inter coding of the frame, i.e. from the video codec, or they can be determined from a motion estimation search.

Step S51 identifies, for each candidate group as schematically illustrated by the line L2, a respective reference group of at least one image element in the second image. The reference group associated with the candidate group is preferably identified based on the displacement vector associated with the candidate group. Thus, the displacement vector points, when applied from a corresponding position that the candidate group would have had in the second image, towards the reference group.

The following step S52 calculates, for each candidate group as schematically illustrated by the line L2, a difference measure representative of a difference in property values of the image elements in the candidate group and its identified reference group. In a preferred embodiment, the measure is calculated based on the absolute values of the difference in property values for image elements occupying corresponding positions in the candidate group and the reference group. Preferred examples of such difference measured include sum of absolute difference (SAD) and sum of squared difference (SSD), well known in the art.

A next step S53 selects a candidate group from the provided group set based on the calculated difference measures, i.e. preferably selects the candidate group resulting in the smallest SAD or SSD measure. The method continues to step S44 of FIG. 7 that determines the property values of the group in the interpolated/extrapolated frame based on the property values of the selected candidate group and the reference group associated with the selected candidate group. In a preferred embodiment, the image element property values are determined as a linear combination of the property values of the selected candidate group and the associated reference group. Any weights applied to the property values in the selected group and any weights of the property values in the associated group are preferably determined based on difference in time between the interpolated/extrapolated frame and the first frame with the selected candidate group and the interpolated/extrapolated frame and the second frame, respectively. In other words, larger weights are used if the distance in time is small as compared to longer time distances. The values of the frame weights can also be utilized to reflect acceleration as is known in the art. Note though that only those image elements not classified as border image elements according to the present invention in the candidate group and/or reference group are utilized in the determination of step S44.

In the embodiment described above, the reference groups associated with the candidate groups are identified based on the displacement vectors assigned to or estimated for the candidate groups. This then presumes that a same vector is used for traveling from a candidate group to the group to be interpolated/extrapolated as when going from the group to be determined to a reference group. The present invention is though not limited thereto.

In another embodiment, a second set of multiple second candidate groups present in the second frame is provided together with the provision of the first set of multiple first candidate groups in the first frame. Also these second candidate groups comprise at least one image element each and preferably have a respective displacement vector. A difference measure can then be calculated for each pair of one first candidate group and one second candidate group from the first and second sets, respectively. Alternatively, not all combinations of first and second candidates are tested but only a limited portion thereof, reflecting plausible combinations of candidate groups, such as groups present on the same frame positions in the first and second frames and groups having associated displacement vectors identifying other candidate groups in the other frames.

A first and a second candidate group are thereafter selected based on the difference measures. The image element property values of the group to be determined are calculated based on the property values of these selected candidate groups as previously described, though excluding border image elements in the two candidate groups.

Figure 9:
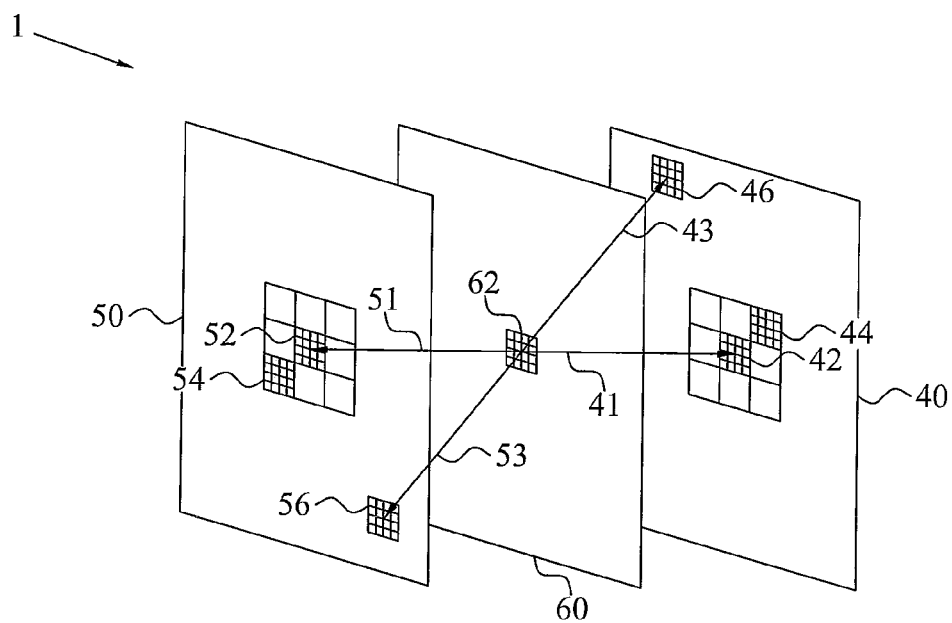
FIG. 9 is a diagram schematically illustrating interpolation of pixel values from a previous and a following image.

FIG. 9 illustrates a portion of a video sequence 1 having a first frame 40 and a second frame 50 and an intermediate frame 60 to be determined during frame rate-up conversion. A group 62 of image elements to be determined is indicated in the intermediate frame 60. Suitable first candidate groups 42, 44, 46 are shown in the first frame 40 and corresponding second candidate groups 52, 54, 56 are shown in the second frame 50. These candidate groups typically comprise the groups 42, 52 having the corresponding position in the first 40 and second 50 frame as the group 62 has in the intermediate frame 60. The displacement vectors 41, 51 of these groups 42, 52 have been indicated in the figure, passing through the group 62 to be determined. Other candidates include the neighboring groups 44, 54 of these candidate groups 42, 52 having corresponding positions. Also those groups 46, 56 having associated displacement vectors 43, 53 that pass through the group 62 in the intermediate frame 60 are preferred candidate groups according to the invention.

Figure 10:
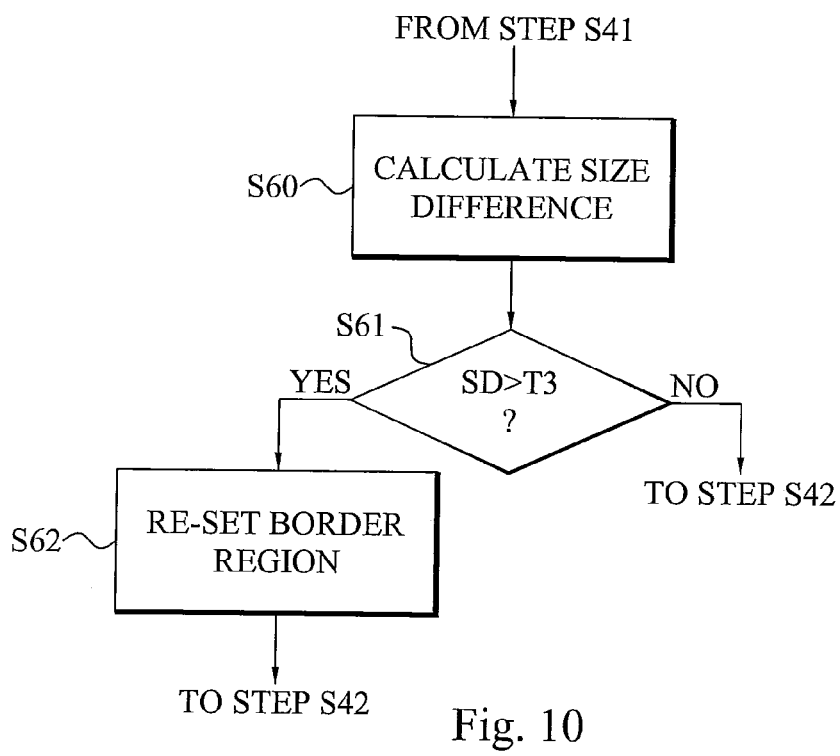
FIG. 10 is a flow diagram illustrating additional steps of the determining method of FIG. 7.

FIG. 10 is a flow diagram illustrating additional steps of the estimating method of FIG. 7. The method continues from step S41 of FIG. 7. In a next step S60 a relative size of a border region identified in the first image is compared to the size of a border region identified in the second image. Furthermore, these two border regions correspond to the same image edge in the first and second image, i.e. the upper horizontal edge, the lower horizontal edge, the left vertical edge or the right vertical edge. The step S60 involves calculating a size difference SD between the two border regions. The size difference could represent the difference in the number of columns (or rows) in the two border regions. Alternatively, the size difference is a representation of the difference in the number of image elements between the two corresponding border regions.

If the size difference SD between the two border regions is equal to or lower than a threshold value T3 in the comparison of step S61, the method continues to step S42 of FIG. 7. However, if the size difference instead exceeds the threshold in step S61, the method continues to step S62, where a re-classification of image elements in the second image (or the first image) is performed based on the size of the border region identified in the first image (or the second image). In such a case, image elements in the second image (or the first image) having corresponding positions as those image elements in the first image (or second image) identified as belonging to the border region of the first image (or second image) are classified as belonging to the border region of the second image (or first image). The method then continues to step S42.

Thus, this check of steps S60 to S62 investigates whether the size of the border region at corresponding image edges increases or decreases much when moving from one image to a next image in the video sequence. For instance, the border region size could be two columns along one of the edges in a first image. A next image in the video sequence, though, has a classified border region as comprising seven columns along the same image edge. In such a case, there may have been a misclassification of some of the internal image elements as being presumed border image elements. This can in particular happen if the image is very dark, such as depicts a night sky, and therefore has little difference in luminance value between internal and border image elements, in particular if no threshold adjustment is performed. By comparing the identified border region size to the corresponding size of a previously classified image or multiple previously classified images, such misclassifications can be identified and corrected according to the procedure described above and illustrated in FIG. 10. This means, taking the above presented example, that the size of the border region in the second image is re-set to have a corresponding size as the first image, i.e. two columns. The image elements in the five "misclassified" columns are then re-classified in step S62 as internal image elements and not border image elements. These means that the image elements in these five "misclassified" columns are available as reference image elements in the interpolation/extrapolation as they now are regarded as internal image elements.

Figure 13:
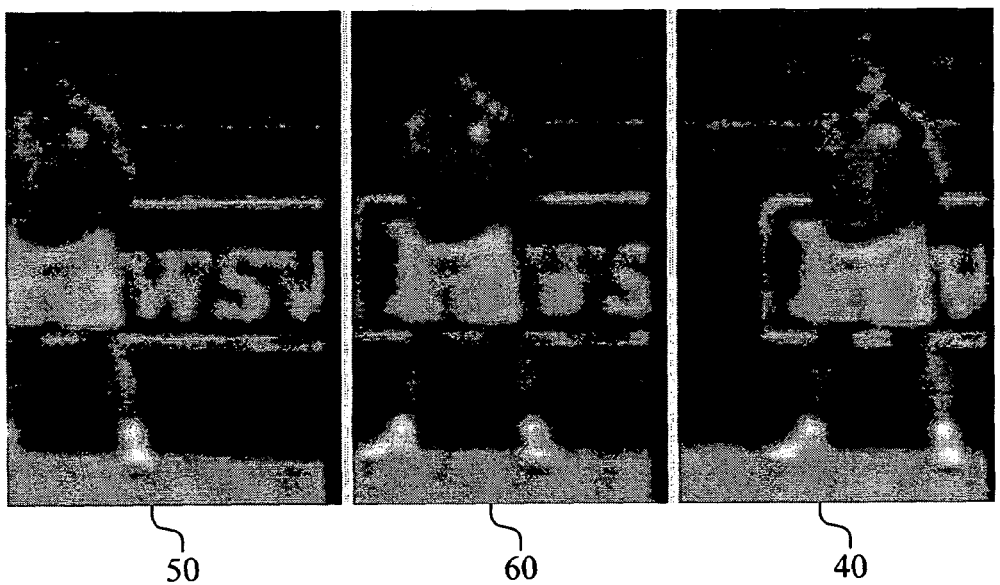
FIG. 13 illustrates the drawings of FIG. 1 but where a middle drawing has been interpolated according to the present invention.

FIG. 13 illustrates the result of a frame rate-up conversion utilizing the image classification according to the present invention. As is seen in the interpolated image 60, the border present on the right edge of the left image 50 does not emerge within the internal region of the interpolated image 60. In clear contrast, by labeling the image elements in the outermost right columns as border image elements of the present invention, these image elements are removed from the interpolation and thereby prevents the black line present in the middle image of FIG. 1 utilizing prior art techniques from appearing inside the image 60 in FIG. 13. In clear contrast, the dark border images can be handled separately by simply assigning the property value (luminance) of these border image elements to the image elements occupying corresponding positions in the interpolated image 60 as has been done in the figure. In more detail, a border having a width equal to the largest value of the border in the two reference frames that are used for interpolating/extrapolating is created. The image elements of the created border region can then be filled with the average (in the case of interpolation) image element value from the reference images, i.e. without any motion compensation. Thus, an image element at position (i, j) in the border of an interpolated image is simply determined as an average of the property values of the two image elements occupying the same position but in the two (previous and following) reference frames.

The quality of a constructed frame or image in a frame rate up-conversion scheme is increased by applying the present invention. This means that areas close to the image border will be presented more accurately. The present invention also prevents (black) lines from moving into the constructed image, thereby a higher overall quality can experienced.

Figure 11:
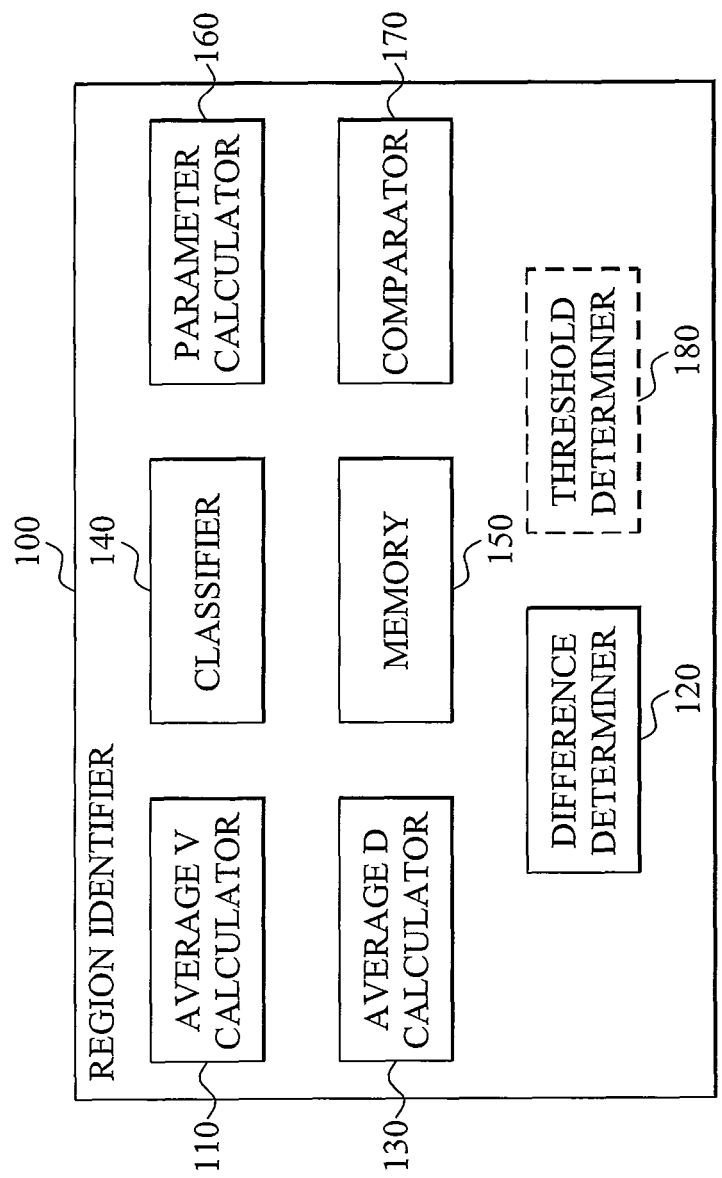
FIG. 11 is a schematic block diagram of a region identifier according to an embodiment of the present invention.

FIG. 11 is a schematic block diagram of a region identifier 100 according to an embodiment of the present invention. The region identifier 100 comprises a calculator 110 for calculating an average value of the property values of image elements in a current row or column (row/column). A difference determiner 120 is arranged in the identifier 100 for determining, for each image element in the row/column, a difference in property values of the image element and a corresponding image element present on a same column/row in a neighboring row/column in the image. A calculator 130 uses the determined difference values for calculating an average difference for the current row/column.

The region identifier 100 also comprises a classifier 140 arranged for classifying the image elements in the current row/column as belonging to a border region or an internal image region based on the average value and the average difference from the two calculators 110, 130.

In a preferred embodiment, the identifier 100 includes a parameter calculator 160 for calculating a classification parameter based on the average value and the average difference as previously disclosed, i.e. sum or weighted sum of the average value and average difference. A comparator 170 is provided in the identifier 100 for comparing the classification parameter with a threshold value, such as fetched from an associated memory 150. The classifier 140 is in this embodiment arranged for classifying the image elements in the current row/column as belonging to the border region or not based on the comparison. In a preferred implementation, applicable in connection with black lines/borders, the current row/column is classified as belonging to the border region of the image if the classification parameter is below the threshold value.

An optional embodiment of the region identifier 100 comprises a threshold determiner or adjuster 180. In such a case, the average value calculator 110 is also configured for calculating an average of the property values in the image or at least a major portion thereof. The determiner 180 utilizes this average property value for determining, selecting or adjusting the threshold value used by the comparator 170 together with the classification parameter.

In another optional embodiment, the difference determiner 120 is configured for determining a first difference in property values of a current image element in the row/column classified as border row/column and an adjacent image element in the same row/column. The determiner 120 also calculates a second difference between the property value of the current image element and the average value calculated by the average value calculator 110. The classifier 140 re-classifies, in this embodiment, the current image element or indeed the border row/column to which the image element belongs as non-border image element or non-border row/column if the first difference differs from the second difference with more than a maximum threshold, such as fetched from the memory 150. This procedure could be performed for each image element in the current row/column unless a re-classification of the whole row/column is performed by the classifier 140 upon detection of a "misclassified" image element. Furthermore, the procedure is preferably applied to all rows/columns in the image classified as being border rows/columns.

The region identifier 100 preferably investigates all outermost columns and rows in the image and continues the investigation on more internal rows and columns if an outer row or column is classified as being a border row or column according to the invention.

The units of the region identifier 100 can be provided in hardware, software and/or a combination of hardware and software. The units can be implemented in a video or image processing terminal or server, such as implemented in or connected to a node of a wired or wireless communications system. Alternatively, the units of the region identifier 100 can be arranged in a user terminal, such as TV decoder, computer, mobile telephone, or other user appliance having or being connected to an image rendering device.

Figure 12:
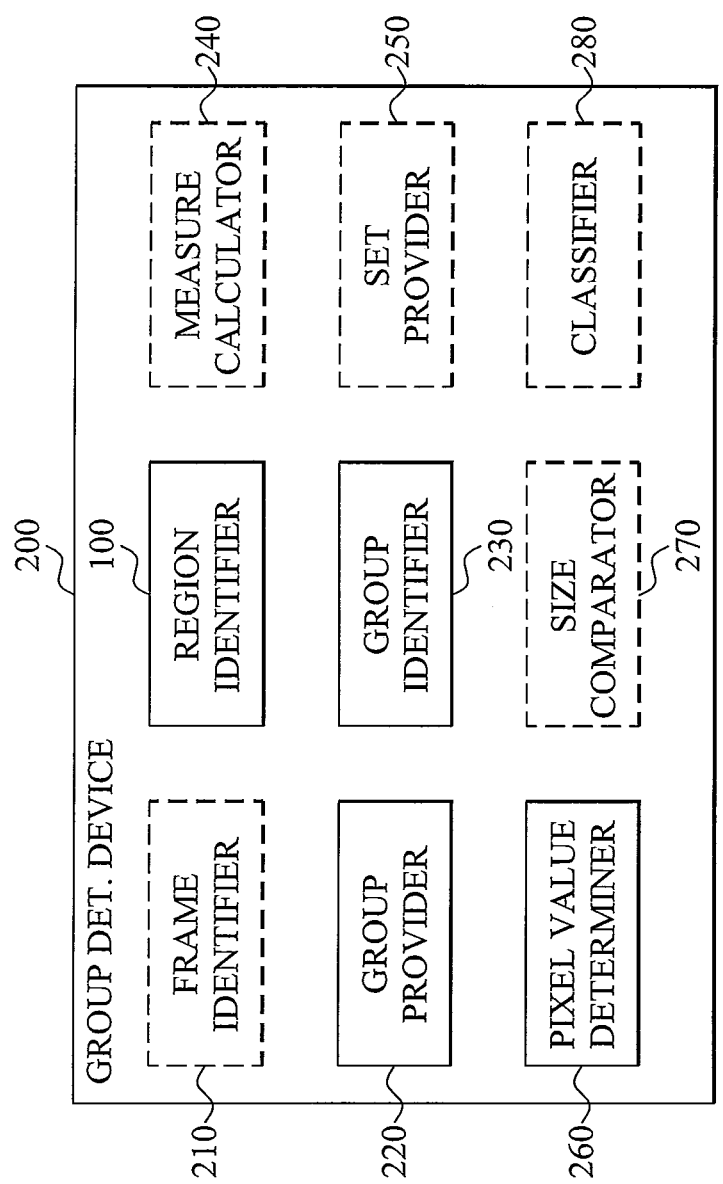
FIG. 12 is a schematic block diagram of a group determining device according to an embodiment of the present invention.

FIG. 12 is a schematic block diagram of a device 200 for determining a group of image elements by estimating the property values of the at least one image element in the group. The device 200 optionally comprises a frame or image identifier 210 for identifying at least a first and a second image in a video sequence. These two images are associated with different time instances in the sequence as compared to a current image comprising the group to be determined. In the case of group interpolation, the first image is a previous or following image, while the second frame is a following or previous image. For group extrapolation both the first and second images are previous or following images in relation to the current image.

The determining device 200 comprises a region identifier 100 according to the present invention, described above and illustrated in FIG. 11. The region identifier 100 is utilized for identifying those image elements in the first image and preferably also the second image that are classified as belonging to the respective border region of the images.

A group provider 220 is arranged in the device 200 for providing a first group of multiple image elements in the first image. This group comprises at least one image element classified by the identifier 100 as border image element and at least one image element classified by the identifier 100 as non-border image element. The device 200 also comprises a group identifier 230 for identifying a second group of at least one, preferably multiple, image elements in the second image. A value determiner 260 then determines the property values of the group to be determined based on the property values of those image elements in the two groups from the provider 220 and the identifier 230 that are not classified as border image elements.

The value determiner 260 preferably also determines the property values of the image elements present in the border region but then separately from the motion compensation based interpolation/extrapolation. In a preferred embodiment, a size comparator 270 of the device 200 compares, for each image edge, the relative border sizes of the two reference images used in the image interpolation/extrapolation. The border(s) at the edges of the image to be constructed is (are) selected as the largest border at that edge in the reference images. The property values of the border image elements are then calculated based on the property values of the image elements occupying the same positions in the reference image. Thus, image element at position (i, j) in the border gets a property value equal to the average of the property values of the image elements occupying the same position (i, j) but in the reference frames.

In an optional embodiment, a set provider 250 is arranged in the device 200 for providing a set of multiple candidate groups in the first image. Each of the candidate groups comprise at least one image element and has a respective displacement vector. The group identifier then identifies a respective second group in the second image for each of the candidate groups. This identification is preferably performed based on displacement vectors associated with the candidate groups. A measure calculator 240 calculates a difference measure for each candidate group, where the measure is representative of a difference in property values of the candidate group and its identified second group. The measure is preferably a SAD or SSD measure, i.e. based on the absolute values of the image element differences.

The group provider 220 is, in this embodiment, arranged for selecting a candidate group from the provided set based on the difference measures by the calculator 240, i.e. preferably the candidate group having the smallest (SAD or SSD) difference measure. The value determiner 260 determines the property values of the current group based on the property values of the selected candidate group and its associated second group, typically a linear combination of the image element values of these two groups, though excluding any border image elements in the groups.

The optional size comparator 270 is preferably provided in the determining device 200 for comparing a relative size of a border region in the first image and the border region in connection with a same image edge in the second image. A classifier 280 uses this size comparison for re-classifying image elements in the second image previously classified as border image elements into internal image elements if the size difference exceeds a threshold value. The re-classified image elements then occupies image positions that are classified as internal region in the first image but were classified as border region in the second image by the region identifier 100.

The units of the determining device 200 can be provided in hardware, software and/or a combination of hardware and software. The units can be implemented in a video or frame processing terminal or server, such as implemented in or connected to a node of a wired or wireless communications system. Alternatively, the units 1 of the determining device 200 can be arranged in a user terminal, such as TV decoder, computer, mobile telephone, or other user appliance having or being connected to an image rendering device.

It will be understood by a person skilled in the art that various modifications and changes may be made to the present invention without departure from the scope thereof, which is defined by the appended claims.

REFERENCES

[1] Zhai, J., Yu, K., Li, J. & Li, S., 2005, A Low Complexity Motion Compensated Frame Interpolation Method, *The 2005 IEEE International Symposium on Circuits and Systems (ISCAS2005)*, Kobe, Japan, 23-26 May 2005.

[2] Chen, Y.-K., Vetro, Y.-K., Sun H., & Kung S.-Y., 1998, Frame Rate Up-Conversion Using Transmitted True Motion, to appear in *Proc. of 1998 Workshop on Multimedia Signal Processing*, December 1998.

[3] Choi, B. T., Lee, S. H., & Ko, S. J., 2000, New frame rate up-conversion using bi-directional motion estimation, *IEEE Trans. Consum. Electron.*, Volume 46, Number 3, pp. 603-609.

The invention claimed is:

1. A method of estimating property values of a group of at least one image element in an image associated with a time instance in a video sequence, said method comprising the steps of:
   identifying image elements belonging to a border region at a frame edge of a first image associated with a first different time instance in said video sequence;
   providing a first group in said first image, said first group comprising at least one image element identified as belonging to said border region of said first image and at least one image element identified as not belonging to said border region of said first image;
   identifying a second group of at least one image element in a second image associated with a second different time instance in said video sequence; and
   determining said property value of said group based on property values of said image elements of said first group identified as not belonging to said border region in said first image and property values of said second group.

2. The method according to claim 1, wherein said identifying step comprises identifying said second group in said second image based on a displacement vector associated with said first group.

3. The method according to claim 1, further comprising identifying image elements belonging to a border region at a frame edge of said second image, wherein said determining step comprises determining said property value of said group based on property values of said image elements of said first group identified as not belonging to said border region in said first image and property values of image elements of said second group identified as not belonging to said border region in said second group.

4. The method according to claim 3, further comprising the steps of:
   comparing a relative size of said border region of said first image and said border region of said second image; and
   classifying Image elements in said second image having corresponding positions as image elements of said first image identified as belonging to said border region of said first image as belonging to said border region of said second image if said relative size exceeds a size threshold.

5. A device for estimating property values of a group of at least one image element in an image associated with a time instance in a video sequence, said device comprising:
   a memory and a processor;
   a region identifier for identifying, when executed by the processor, image elements belonging to a border region at a frame edge of a first image associated with a first different time instance in said video sequence;
   a group provider for providing, when executed by the processor, a first group in said first image, said first group comprising at least one image element identified as belonging to said border region of said first image and at least one image element identified as not belonging to said border region of said first image;
   a group identifier for identifying, when executed by the processor, a second group of at least one image element in a second image associated with a second different time instance in said video sequence;
   a value determiner for determining, when executed by the processor, said property value of said group based on property values of said image elements of said first group identified as not belonging to said border region in said first image and property values of said second group.

6. The device according to claim 5, wherein said group identifier identifies, when executed by the processor, said second group in said second image based on a displacement vector associated with said first group.

7. The device according to claim 5, wherein said region identifier
   identifies image elements belonging to a border region at an edge of said second image, and said value determiner determines said property value of said group based on property values of said image elements of said first group identified as not belonging to said border region in said first image and property values of image elements of said second group identified as not belonging to said border region in said second group.

8. The device according to claim 7, further comprising:
   a size comparator for comparing a relative size of said border region of said first image and said border region of said second image; and
   a classifier for classifying image elements in said second image having corresponding positions as image elements of said first image identified as belonging to said border region of said first image as belonging to said border region of said second image if said relative size exceeds a size threshold.

* * * * *